US008979328B2

(12) United States Patent
Wang He

(10) Patent No.: US 8,979,328 B2
(45) Date of Patent: Mar. 17, 2015

(54) OPTICAL LENS AND LIGHTING DEVICE HAVING SAME

(71) Applicant: Hon Hai Precision Industry Co., Ltd., New Taipei (TW)

(72) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 132 days.

(21) Appl. No.: 13/895,374

(22) Filed: May 16, 2013

(65) Prior Publication Data

US 2014/0177229 A1 Jun. 26, 2014

(30) Foreign Application Priority Data

Dec. 24, 2012 (TW) ............................. 101149431 A

(51) Int. Cl.

*F21V 13/04* (2006.01)
*F21K 99/00* (2010.01)
*G02B 6/00* (2006.01)

(52) U.S. Cl.

CPC . *F21V 13/04* (2013.01); *F21K 9/58* (2013.01); *F21K 9/50* (2013.01); *G02B 6/00* (2013.01)

USPC ..................................... 362/337; 362/311.02

(58) Field of Classification Search

CPC ............. F21V 13/04; F21K 9/50; F21K 9/58; G02B 6/00

USPC ............. 362/311.02, 311.03, 311.04, 311.05, 362/337, 339, 340

See application file for complete search history.

(56) References Cited

U.S. PATENT DOCUMENTS

| | | | | |
|---|---|---|---|---|
| 6,679,621 | B2 * | 1/2004 | West et al. | 362/327 |
| 7,659,552 | B2 * | 2/2010 | Chang | 257/98 |
| 2008/0151551 | A1 * | 6/2008 | Yang et al. | 362/308 |
| 2011/0176314 | A1 * | 7/2011 | Chuang | 362/341 |
| 2013/0194810 | A1 * | 8/2013 | Sun et al. | 362/308 |

* cited by examiner

*Primary Examiner* — David V Bruce

(74) *Attorney, Agent, or Firm* — Novak Druce Connolly Bove + Quigg LLP

(57) ABSTRACT

An optical lens for increasing viewing angle of light from a light emitting diode includes a bottom surface, a reflective surface, and a side surface connected between the bottom surface and the reflective surface. The light emitting diode is received in the bottom surface. The reflective surface defines a cone-shaped recess and is concaved from a top of the optical lens towards the bottom surface. A vertex angle of the cone-shaped recess defined by the reflective surface is less than or equal to 60 degrees.

16 Claims, 4 Drawing Sheets

OPTICAL LENS AND LIGHTING DEVICE HAVING SAME

BACKGROUND

1. Technical Field

The disclosure generally relates to optical lenses, and particularly relates to an optical lens to increase a viewing angle of a light source and a lighting device having the optical lens.

2. Description of Related Art

In recent years, due to excellent light quality and high luminous efficiency, light emitting diodes (LEDs) have increasingly been used as substitutes for incandescent bulbs, compact fluorescent lamps and fluorescent tubes as light sources of illumination devices.

Generally, light intensity of a light emitting diode gradually decreases from a middle portion to lateral sides thereof. Such a feature makes the LED unsuitable for functioning as a light source which needs a uniform illumination, for example, a light source for a direct-type backlight module for a liquid crystal display (LCD). It is required to have an optical lens which can help the light from a light emitting diode to have a wider viewing angle and a uniform intensity. Unfortunately, the conventional optical lens and a lighting device having the conventional optical lens can not obtain a satisfactory effectiveness.

What is needed, therefore, is an optical lens and a lighting device having the optical lens to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments of an optical lens and a lighting device will now be described in detail below and with reference to the drawings.

Figure 1:
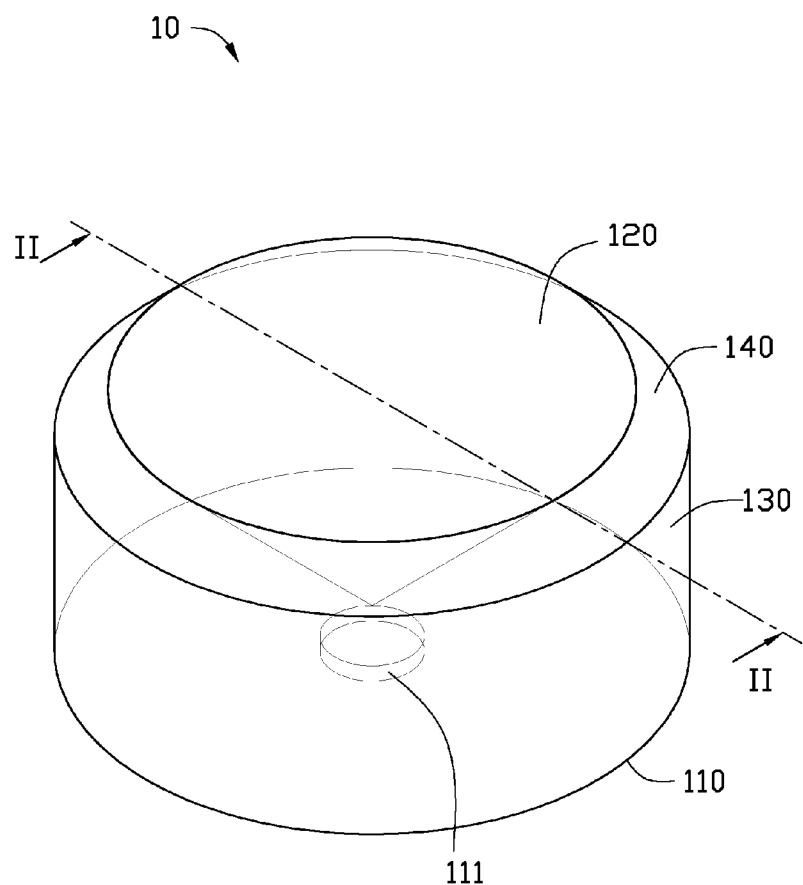
FIG. 1 is an isometric view of an optical lens in accordance with an embodiment of the present disclosure.
Figure 2:
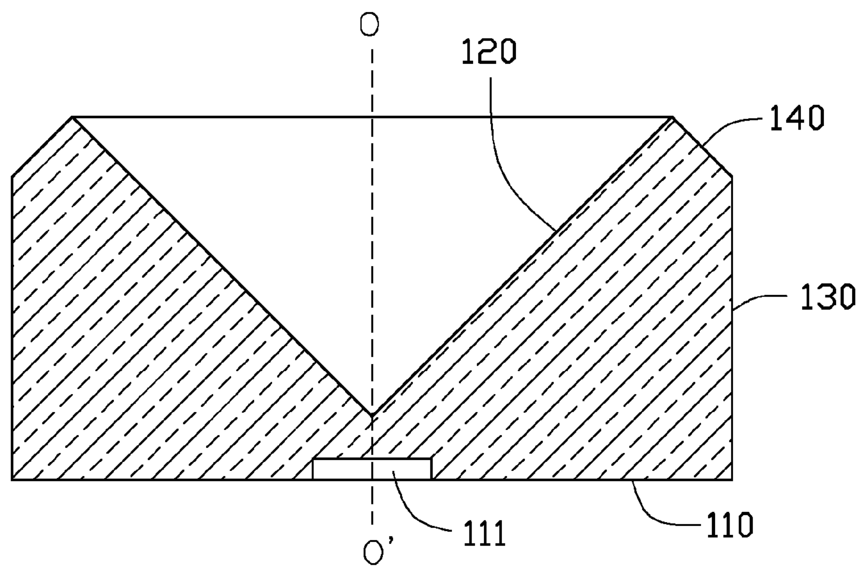
FIG. 2 is a cross sectional view of the optical lens in FIG. 1, taken along a line II-II.

Referring to FIGS. 1-2, an optical lens 10 in accordance with an embodiment is provided. The optical lens 10 is made of a material selected from a group consisting of polycarbonate (PC), polymethyl methacrylate (PMMA) and glass. The optical lens 10 includes a bottom surface 110, a reflective surface 120 and a side surface 130 connected between the bottom surface 110 and the reflective surface 120. The optical lens 10 has an optical axis OO'. In this embodiment, the optical lens 10 is axisymmetric with respect to the optical axis OO'.

The bottom surface 110 is a flat surface. The bottom surface 110 defines a recess 111 to receive a light emitting diode.

The reflective surface 120 defines a cone-shaped cavity and is concaved from a top of the optical lens 10 towards the bottom surface 110. A vertex of the reflective surface 120 is positioned at the optical axis OO' of the optical lens 10. In this embodiment, an included angle of the reflective surface 120 defining the cone is less than or equal to 120 degrees. Preferably, the included angle of the reflective surface 120 defining the cone is in a range from 60 degrees to 120 degrees. In other words, an included angle between the optical axis OO' and the reflective surface 120 (i.e., a vertex angle of the cone) is less than or equal to 60 degrees. Preferably, the included angle between the optical axis OO' and the reflective surface 120 is in a range from 30 degrees to 60 degrees. Therefore, light from the light emitting diode light source is totally reflected by the reflective surface 120.

The side surface 130 is connected between the bottom surface 110 and the reflective surface 120. In this embodiment, the side surface 130 constitutes a smooth circumferential periphery of a cylinder. Light from the light emitting diode is reflected by the reflective surface 120, and emits into an outer environment through the side surface 130. Alternatively, the side surface 130 can be a rough surface to achieve a more uniform light distribution.

Preferably, the optical lens 10 can further include a connecting surface 140. The connecting surface 140 is located between and connecting the reflective surface 120 and the side surface 130. An included angle between the connecting surface 140 and the reflective surface 120 is less than 90 degrees.

Figure 3:
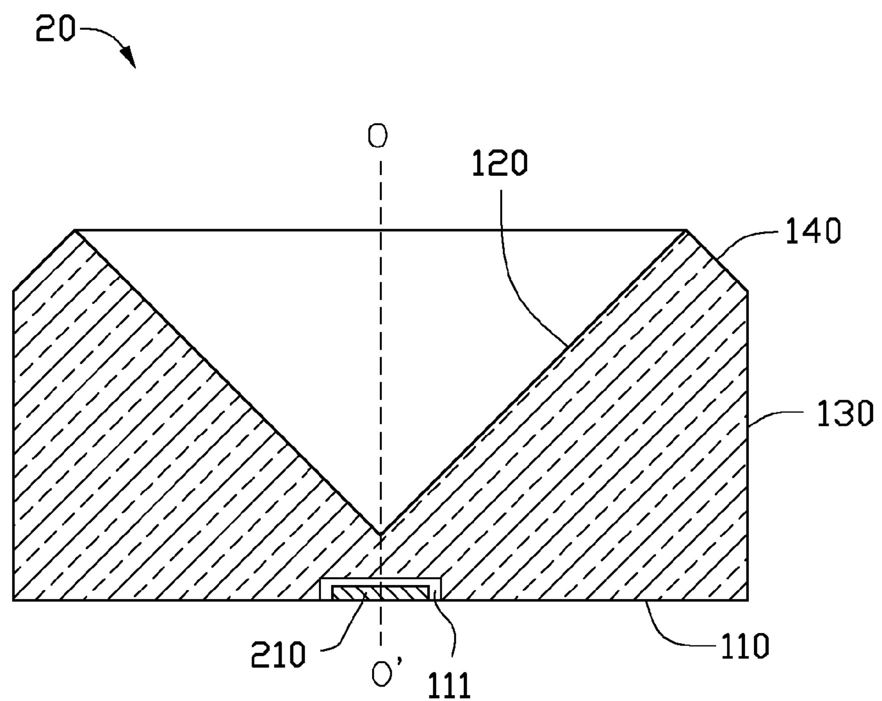
FIG. 3 is a cross sectional view of a lighting device having the optical lens in FIG. 1.

FIG. 3 shows a lighting device 20 having the optical lens 10. The lighting device 20 includes the optical lens 10 and a light emitting diode 210. The light emitting diode 210 is positioned at the side of the bottom surface 110 away from the reflective surface 120. Light from the light emitting diode 210 emits into the optical lens 10 from the bottom surface 110. The light entering the optical lens 10 from the bottom surface 110 is reflected by the reflective surface 120, and emits out of the optical lens 10 through the side surface 130. Preferably, the light emitting diode 210 is received in the recess 111 in the bottom surface 110. In this embodiment, the light emitting diode 210 is located at the optical axis OO' of the optical lens 10.

In the optical lens 10 and the lighting device 20 described above, since the reflective surface 120 is cone-shaped and the vertex angle of the cone (i.e., the included angle between the reflective surface 120 and the optical axis OO') is less than or equal to 60 degrees, when light from the light emitting diode 210 emits into the optical lens 10 from the bottom surface 110, the light will be totally reflected by the reflective surface 120 and emits along a direction away from the optical axis OO'. Therefore, a viewing angle of the light emitting diode 210 is increased.

Figure 4:
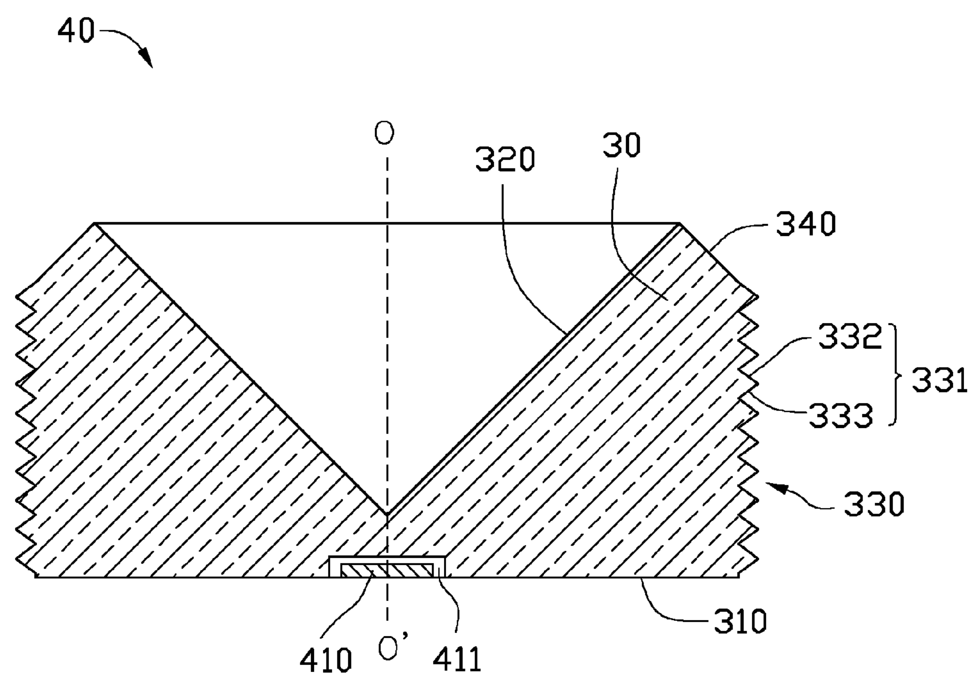
FIG. 4 is a cross sectional view of a lighting device in accordance with a second embodiment of the present disclosure.

Preferably, the optical lens and the lighting device are not limited to above embodiment. Referring to FIG. 4, the lighting device 40 in accordance with a second embodiment includes an optical lens 30 and a light emitting diode 410.

The optical lens 30 includes a bottom surface 310, a reflective surface 320, and a side surface connected between the bottom surface 310 and the reflective surface 320. The bottom surface 310 is a flat surface. The bottom surface 310 defines a recess 411 to receive a light emitting diode 410. The reflective surface 320 is concaved from a top of the optical lens 30 toward the bottom surface 310 and forms a cone-shaped recess. A vertex angle of the cone defined by the reflective surface 120 is less than or equal to 60 degrees. In this embodiment, a plurality of annular protrusions 331 is formed on the side surface 330. The annular protrusions 331 are arranged in a direction from the bottom surface 310 toward the top of the optical lens 30. Preferably, each of the annular protrusions 331 has a triangular cross section, which includes a first surface 332 and a second surface 333. An included angle between the first surface 332 and the second surface 333 is less than 90 degrees.

The light emitting diode 410 is formed at the side of the bottom surface 310 away from the reflective surface 320. In this embodiment, the light emitting diode 410 is located in the recess 411 of the bottom surface 310. When the light emitting diode 410 emits light, the light will be reflected by the reflective surface 320 and emits out of the optical lens 30 through the side surface 330. Since the side surface 330 has a plurality of annular protrusions 331 and the protrusions 331 can refract the light through the side surface 330 toward different directions, a more uniform light distribution can be obtained by the lighting device 40.

Preferably, the optical lens 30 can further include a connecting surface 340. The connecting surface 340 is located between and interconnects the reflective surface 320 and the side surface 330. An included angle between the connecting surface 340 and the reflective surface 320 is less than 90 degrees.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical lens for increasing viewing angle of light from a light emitting diode, comprising:

a bottom surface configured for being proximate to the light emitting diode;

a reflective surface, defining a cone-shaped recess and concaved from a top of the optical lens towards the bottom surface, a vertex angle of the cone-shaped recess defined by the reflective surface being less than or equal to 60 degrees; and a side surface, connected between the bottom surface and the reflective surface.

2. The optical lens of claim 1, wherein the vertex angle of the cone-shaped recess defined by the reflective surface is in a range from 30 degrees to 60 degrees.

3. The optical lens of claim 1, wherein the bottom surface is a flat surface and defines a recess therein, the recess being configured for receiving the light emitting diode therein.

4. The optical lens of claim 1, further comprising a connecting surface located between and connecting the side surface and the reflective surface, an included angle between the connecting surface and the reflective surface is less than 90 degrees.

5. The optical lens of claim 1, wherein the side surface comprises a plurality of annular protrusions, and the annular protrusions are arranged in a direction from the bottom surface to the top of the optical lens.

6. The optical lens of claim 5, wherein each of the annular protrusions has a triangular cross section.

7. The optical lens of claim 6, wherein each of the annular protrusions comprises a first surface and a second surface, and an included angle between the first surface and the second surface is less than 90 degrees.

8. The optical lens of claim 1, wherein the optical lens is made of a material selected from a group consisting of polycarbonate (PC), polymethyl methacrylate (PMMA) and glass.

9. A lighting device, comprising:

an optical lens comprising a bottom surface, a reflective surface, and a side surface connected between the bottom surface and the reflective surface, the reflective surface defining a cone-shaped recess and concaved from a top of the optical lens towards the bottom surface, a vertex angle of the cone-shaped recess defined by the reflective surface being less than or equal to 60 degrees; and a light emitting diode located at a side of the bottom surface away from the reflective surface, light from the light emitting diode emitting into the optical lens via the bottom surface, the light in the optical lens being reflected by the reflective surface to emit out of the optical lens via the side surface.

10. The lighting device of claim 9, wherein the vertex angle of the reflective surface is in a range from 30 degrees to 60 degrees.

11. The lighting device of claim 9, wherein the bottom surface is a flat surface and defines a recess therein, and the light emitting diode is received in the recess.

12. The lighting device of claim 9, wherein the optical lens further comprises a connecting surface located between and connecting the side surface and the reflective surface, and an included angle between the connecting surface and the reflective surface is less than 90 degrees.

13. The lighting device of claim 9, wherein the side surface comprises a plurality of annular protrusions, and the annular protrusions are arranged in a direction from the bottom surface toward the top of the reflective surface.

14. The lighting device of claim 13, wherein each of the annular protrusions has a triangular cross section.

15. The lighting device of claim 14, wherein each of the annular protrusions comprises a first surface and a second surface, and an included angle between the first surface and the second surface is less than 90 degrees.

16. The lighting device of claim 9, wherein the optical lens is made of a material selected from a group consisting of polycarbonate (PC), polymethyl methacrylate (PMMA) and glass.

* * * * *